W. E. SPARKS.

Reversible Latches.

No. 5,885. Reissued May 26, 1874.

Witnesses.
W. B. Ives.
A. J. Tibbits

Sargent & Co.,
assignees of Wm. E. Sparks
Inventor
By Atty.
John R. Earle

AM. PHOTO-LITHOGRAPHIC Co. N. Y. (OSBORNE'S PROCESS.)

UNITED STATES PATENT OFFICE.

WILLIAM E. SPARKS, OF NEW HAVEN, CONNECTICUT, ASSIGNOR TO SARGENT & CO., OF SAME PLACE.

IMPROVEMENT IN REVERSIBLE LATCHES.

Specification forming part of Letters Patent No. 102,723, dated May 3, 1870; reissue No. 5,885, dated May 26, 1874; application filed May 11, 1874.

*To all whom it may concern:*

Be it known that WILLIAM E. SPARKS, of New Haven, in the county of New Haven and State of Connecticut, did invent a new Improvement in Reversible Latches; and we do hereby declare the following, when taken in connection with the accompanying drawings and the letters of reference marked thereon, to be a full, clear and exact description of the same, and which said drawings constitute part of this specification, and represent, in—

Figure 1:
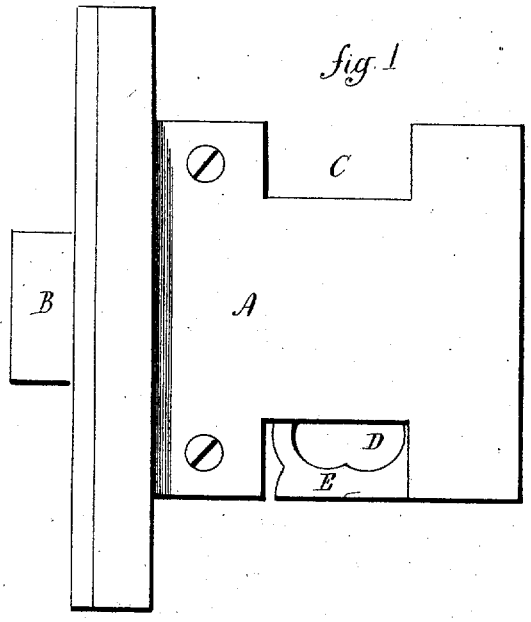
Figure 2:
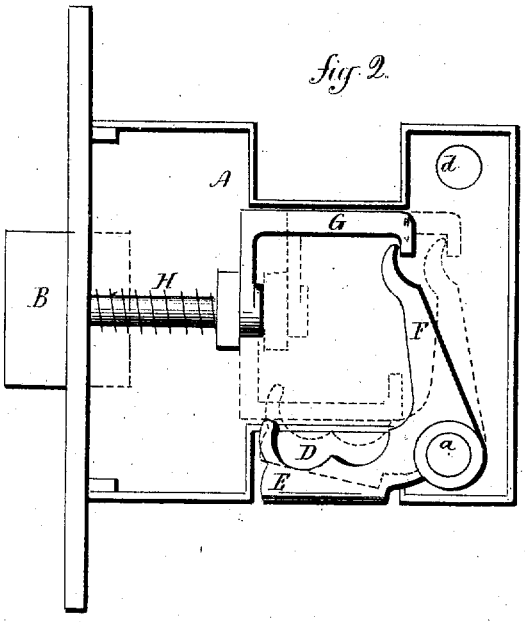

Figure 1, a side view; Fig. 2, a view of the operative mechanism set for a right-hand door; and in Fig. 3 set for a left-hand door.

This invention relates to an improvement in that class of mortise-latches which are constructed to be operated by the thumb-piece or lever extending through the door, the object being to adapt the latch to either a right or left hand door.

The invention consists, first, in constructing the case which incloses the mechanism with a recess, upon both the upper and lower edges, through which the thumb-piece or lever may strike and turn the lever to draw the bolt; second, in the arrangement of the lever through which the bolt is drawn so as to be set at either of two opposite points or fulcrums, one arm engaging the bolt, the other to receive the action of the thumb-piece; third, in a single-armed yoke pivoted to the latch-bolt so as to be turned over from one side of the bolt to the other, whereby the same arm may be used to engage the actuating-lever in either the right or left hand position.

A is the latch-case; B the latch-bolt; C D recesses cut in opposite edges of the case, through which the thumb-piece passes; E is one arm, and F the other arm, of a lever arranged within the case upon a pivot, *a*, as seen in Fig. 2, so that the arm E lies in the recess D in the case, and when the thumb-lever is raised it will raise the arm, as denoted in broken lines. G is a yoke pivoted to the spindle H of the latch-bolt so as to be turned from the position denoted in Fig. 2 to that denoted in broken lines in the same figure, so as to be in connection with the arm F. Therefore, when the lever is raised it draws in the latch-bolt, as denoted in broken lines.

Figure 3:
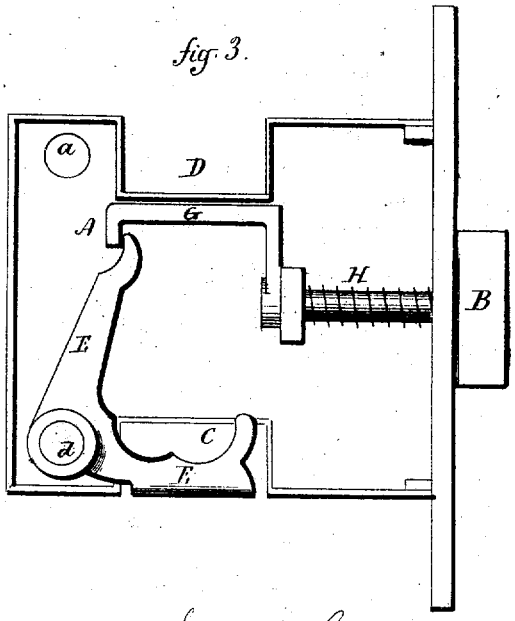

To reverse the latch, as for a left-hand door, remove the lever from its pivot or fulcrum *a*, turn the yoke G over, as denoted in broken lines, Fig. 2, and as seen in Fig 3, then reset the lever on the pivot *d*, which brings the arm E into the opposite recess C, and consequently reverses the operation of the latch.

We claim as the invention of said WILLIAM E. SPARKS—

1. The recesses C D, in opposite sides of a latch-case, substantially as described, through either of which, according to the position of the case, right or left hand, the thumb-lever will engage the mechanism of the latch to draw the bolt.

2. In combination with a latch-bolt, the lever E F constructed to be set in position on either of the fulcrums *a d*, as the case may be, substantially as and for the purpose specified.

3. In combination with the latch-bolt B and lever E F, the reversible yoke G, substantially as and for the purpose specified.

SARGENT & CO.,
By JOSEPH B. SARGENT, *President.*

Witnesses:
B. F. RYDER,
E. W. WELLES.